United States Patent
Chen et al.

(10) Patent No.: US 8,730,685 B2
(45) Date of Patent: May 20, 2014

(54) MOUNTING APPARATUS ASSEMBLY

(75) Inventors: Yun-Lung Chen, New Taipei (TW); Jian Hu, Wuhan (CN); Yu-Ming Xiao, Wuhan (CN); Nian-Yuan Yang, Wuhan (CN); Liang-Chin Wang, New Taipei (TW)

(73) Assignees: Hong Fu Jin Precision Industry (WuHan) Co., Ltd., Wuhan (CN); Hon Hai Precision Industry Co., Ltd., New Taipei (TW)

(*) Notice: Subject to any disclaimer, the term of this patent is extended or adjusted under 35 U.S.C. 154(b) by 263 days.

(21) Appl. No.: 13/304,754

(22) Filed: Nov. 28, 2011

(65) Prior Publication Data

US 2012/0307443 A1    Dec. 6, 2012

(30) Foreign Application Priority Data

May 31, 2011    (CN) .......................... 2011 1 0143635

(51) Int. Cl.
*H05K 7/14*    (2006.01)
*H05K 5/00*    (2006.01)
*H05K 7/00*    (2006.01)
*H05K 7/16*    (2006.01)

(52) U.S. Cl.
USPC ...... 361/802; 361/741; 361/679.33; 361/726; 361/727

(58) Field of Classification Search
USPC ............... 312/223.1, 223.2; 361/679.58, 756, 361/802, 741, 679.31, 679.33, 679.37, 361/679.38, 679.39, 726, 727, 825; 248/224.8, 278.1, 282.1, 285.1, 248/289.11, 284.1
See application file for complete search history.

(56) References Cited

U.S. PATENT DOCUMENTS

| | | | |
|---|---|---|---|
| 2004/0075979 A1* | 4/2004 | Wang et al. .................... | 361/685 |
| 2005/0068720 A1* | 3/2005 | Lambert et al. ................ | 361/685 |
| 2006/0290246 A1* | 12/2006 | Chen et al. ................. | 312/223.2 |
| 2007/0153469 A1* | 7/2007 | Chen et al. .................... | 361/685 |

* cited by examiner

*Primary Examiner* — Hoa C. Nguyen
*Assistant Examiner* — Binh Tran
(74) *Attorney, Agent, or Firm* — Novak Druce Connolly Bove + Quigg LLP

(57) ABSTRACT

A mounting apparatus assembly includes a data storage bracket, a computer enclosure, a mounting member fixed on the data storage bracket and a guiding rail fixed on the computer enclosure. A mounting portion is installed on the mounting member. A plurality of mounting slots is located on the guiding rail. When the bracket rotates relative to the computer enclosure, the mounting portion moves along the guiding rail and engages with the plurality of mounting slots, and the data storage bracket is installed at a required position on the computer enclosure.

16 Claims, 8 Drawing Sheets

MOUNTING APPARATUS ASSEMBLY

BACKGROUND

1. Technical Field

The present disclosure relates to mounting apparatuses assembly, and particularly to a mounting apparatus assembly for mounting a data storage bracket on a computer enclosure.

2. Description of Related Art

Many data storage devices, such as hard disk drives, floppy disk drives, and optical drives, may be simply screwed to a drive bracket of a computer enclosure. The drive bracket may be then screwed to the computer enclosure directly. However, this conventional method of mounting a drive bracket may be cumbersome and time-consuming.

Therefore there is a need for improvement in the art.

DETAILED DESCRIPTION

Figure 1:
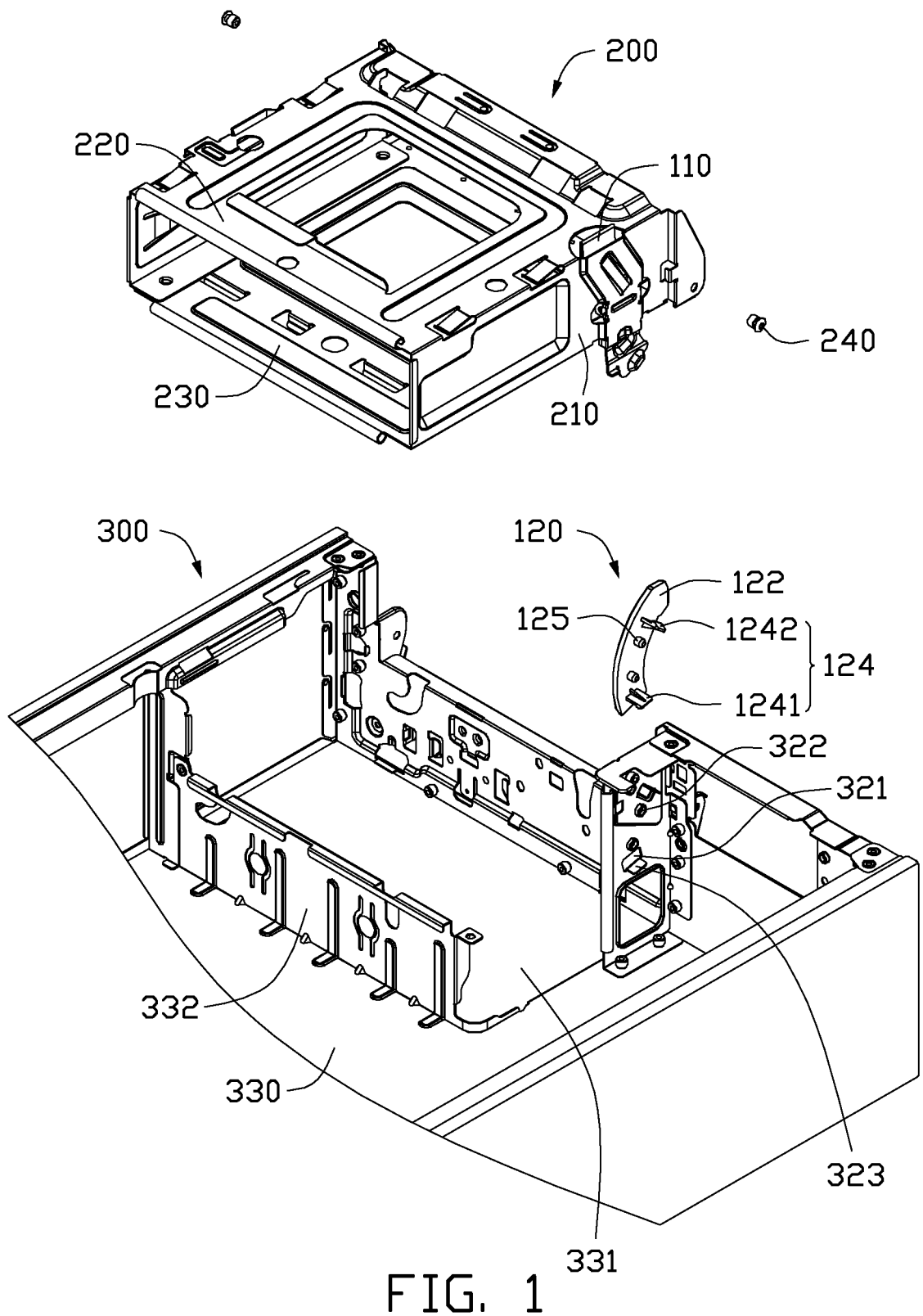
FIG. 1 is an isometric and exploded view of an embodiment of a mounting apparatus assembly; and the mounting apparatus assembly comprises a data storage bracket, a computer enclosure and a mounting member.
Figure 2:
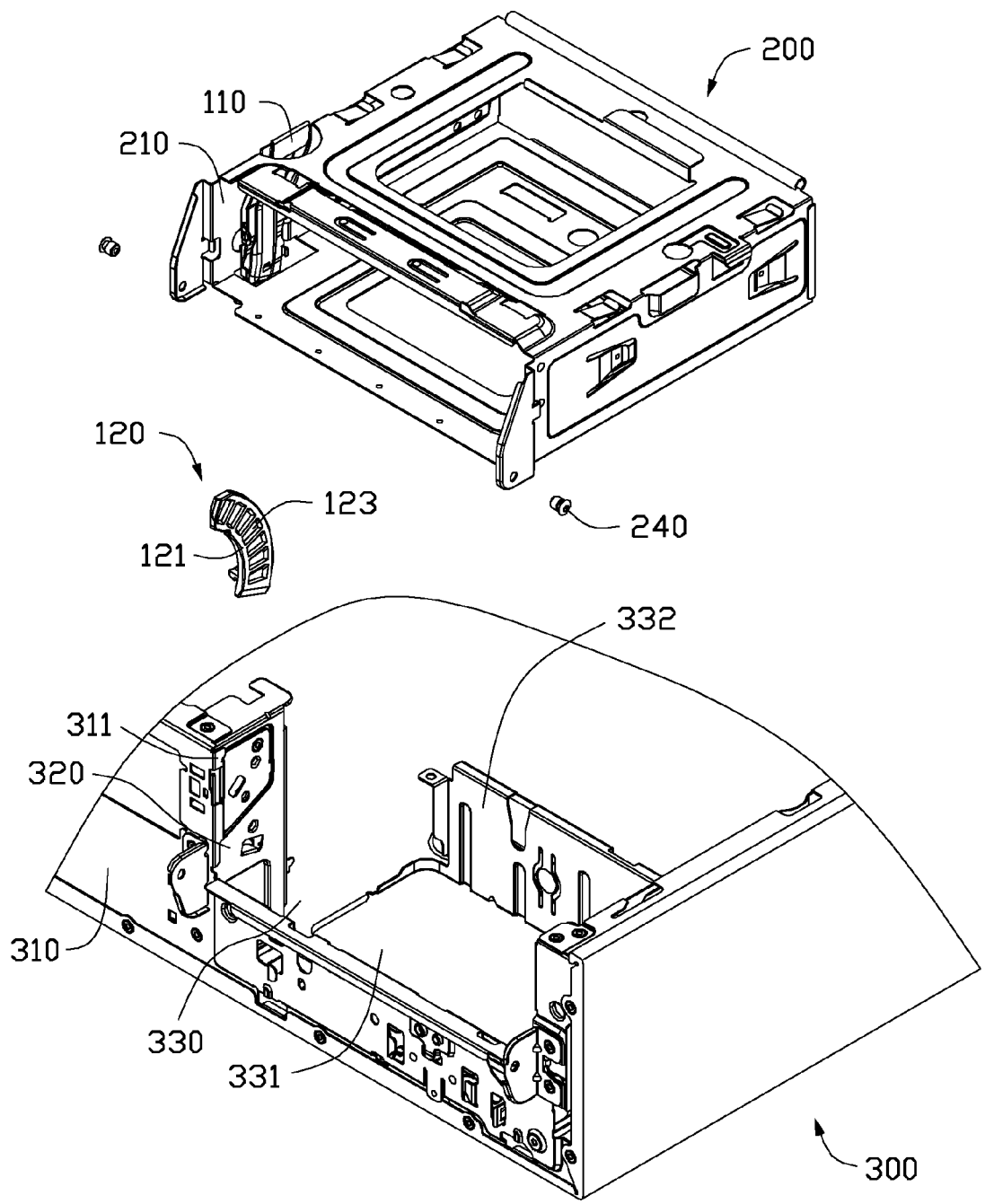
FIG. 2 is an isometric view of the mounting apparatus assembly of FIG. 1, viewed from another aspect.
Figure 3:
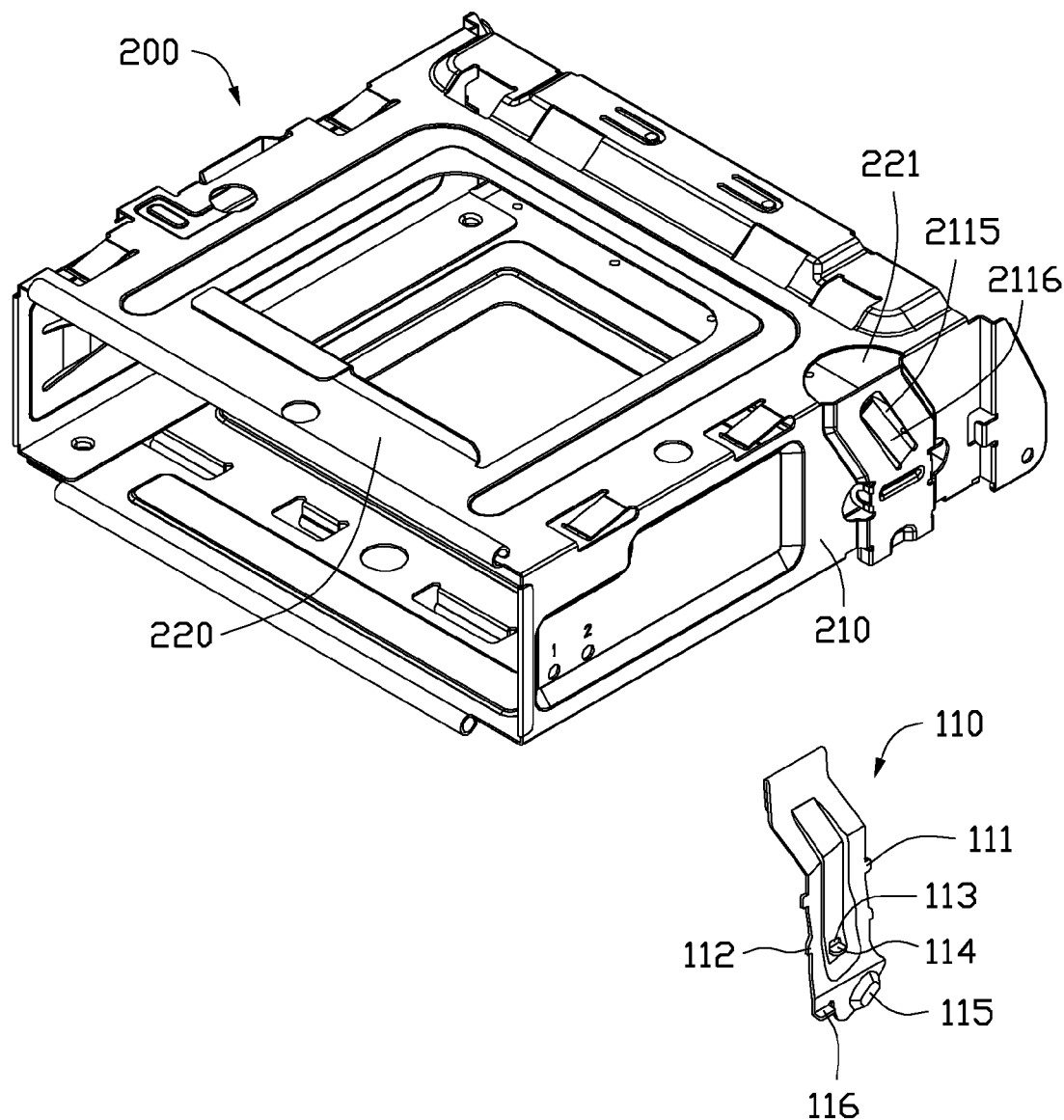
FIG. 3 is an isometric and exploded view of the data storage bracket and the mounting member of the mounting apparatus assembly of FIG. 1.
Figure 4:
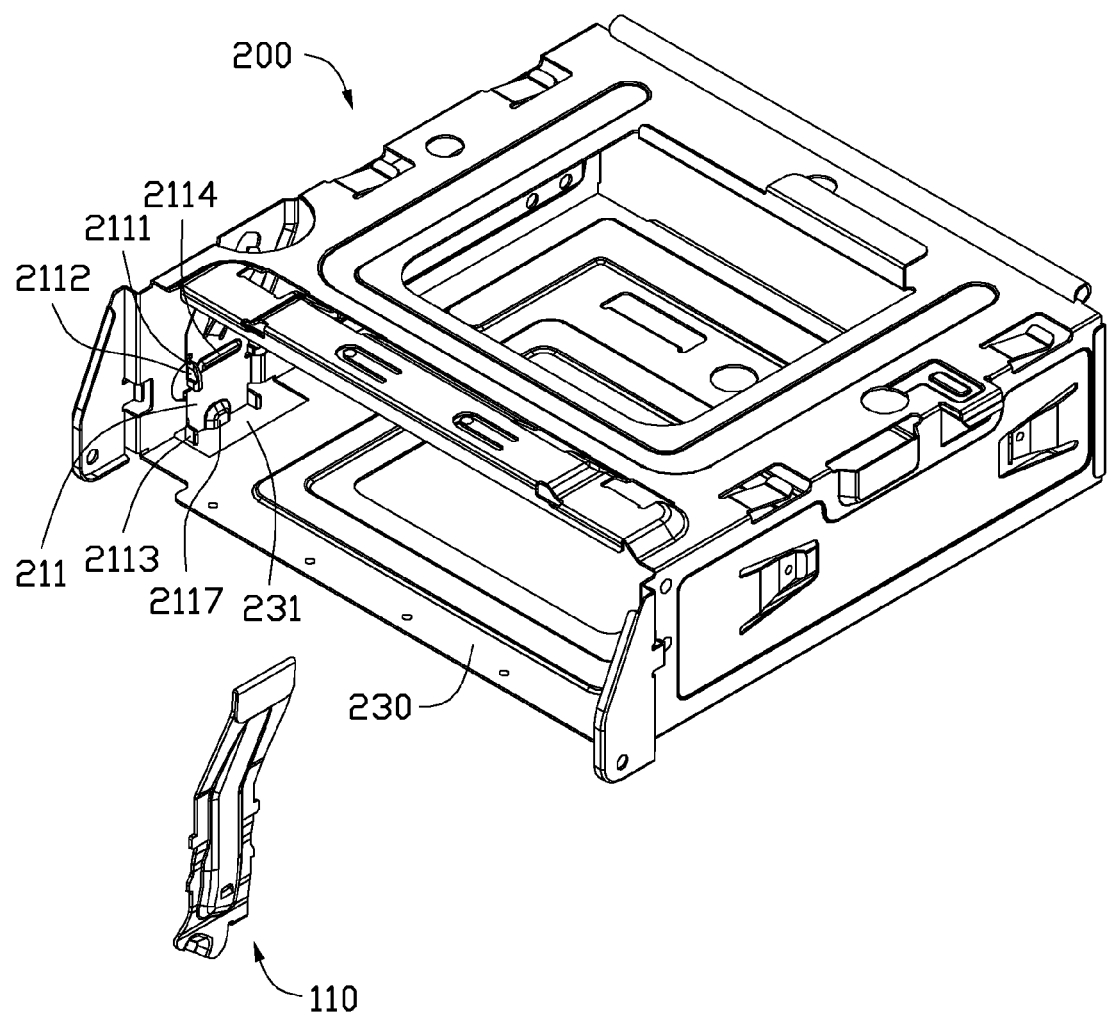
FIG. 4 is an isometric view of the data storage bracket and the mounting member of the mounting apparatus assembly of FIG. 3, viewed from another aspect.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIGS. 1 to 4, a mounting apparatus assembly of an embodiment, for mounting a data storage bracket 200 on a computer enclosure 300, comprises a mounting member 110 and a guiding rail 120. The mounting member 110 is fixed on the data storage bracket 200. The guiding rail 120 is fixed on the computer enclosure 300.

The data storage bracket 200 comprises a sidewall 210, a top wall 220, and a bottom wall 230. A slot 211 is defined on the sidewall 210 for accommodating the mounting member 110. Two first mounting slices 2111 extend from two side edges of a middle of the slot 211. Each of the two first mounting slices 2111 defines a mounting hole 2112. Two second mounting slices 2113 extend from two side edges of a bottom of the slot 211. A resisting portion 2114 is installed on the slot 211 between the two first mounting slices 2111. The slot 211 defines a first opening 2115 adjacent to the resisting portion 2114. An elastic slice 2116 extends from the first opening 2115. A fixing portion 2117 is installed between the two second mounting slices 2113 at the bottom of the slot 211. The top wall 220 defines a semicircular second opening 221. The bottom wall 230 defines a rectangular third opening 231.

Two first fixing slices 111 extend horizontally from two side edges of a middle of the mounting member 110. Two second fixing slices 112 extend horizontally from two side edges of the middle of the mounting member 110 adjacent to the two first fixing slices 111. The mounting member 110 defines a fourth opening 113 adjacent to the two second fixing slices 112. A third mounting slice 114 extends from the fourth opening 113. A mounting portion 115 is installed at a bottom of the mounting member 110. A first restriction slice 116 extends perpendicularly from the bottom of the mounting member 110 adjacent to the mounting portion 115.

The guiding rail 120 is arc shaped and comprises a first surface 121 and a second surface 122. A plurality of mounting slots 123 is installed on the first surface 121. A plurality of hooks 124 and a plurality of protrusion portions 125 extend perpendicularly from the second surface 122. Each of the plurality of hooks 124 comprises a connection wall 1241 extending perpendicularly from the second surface 122, and a top wall 1242 extending diagonally from a top edge of the connection wall 1241.

The computer enclosure 300 comprises a front plate 310, a connection plate 320 perpendicular to the front plate 310, and a bottom plate 330 perpendicular to the front plate 310 and the connection plate 320. The sidewall 210 is pivotally connected to the front plate 310 by a rivet 240. A second restriction slice 311 extends perpendicularly from the front plate 310. The connection plate 320 is fixed on the front plate 310 by fasteners or rivets. The connection plate 320 defines a plurality of fifth openings 321 and a plurality of fixing holes 322. A fastening slice 323 extends perpendicularly from a side edge of each of the plurality of fifth openings 321. The bottom plate 330 defines a sixth opening 331. A supporting slice 332 extends perpendicularly from a side edge of the sixth opening 331.

Figure 5:
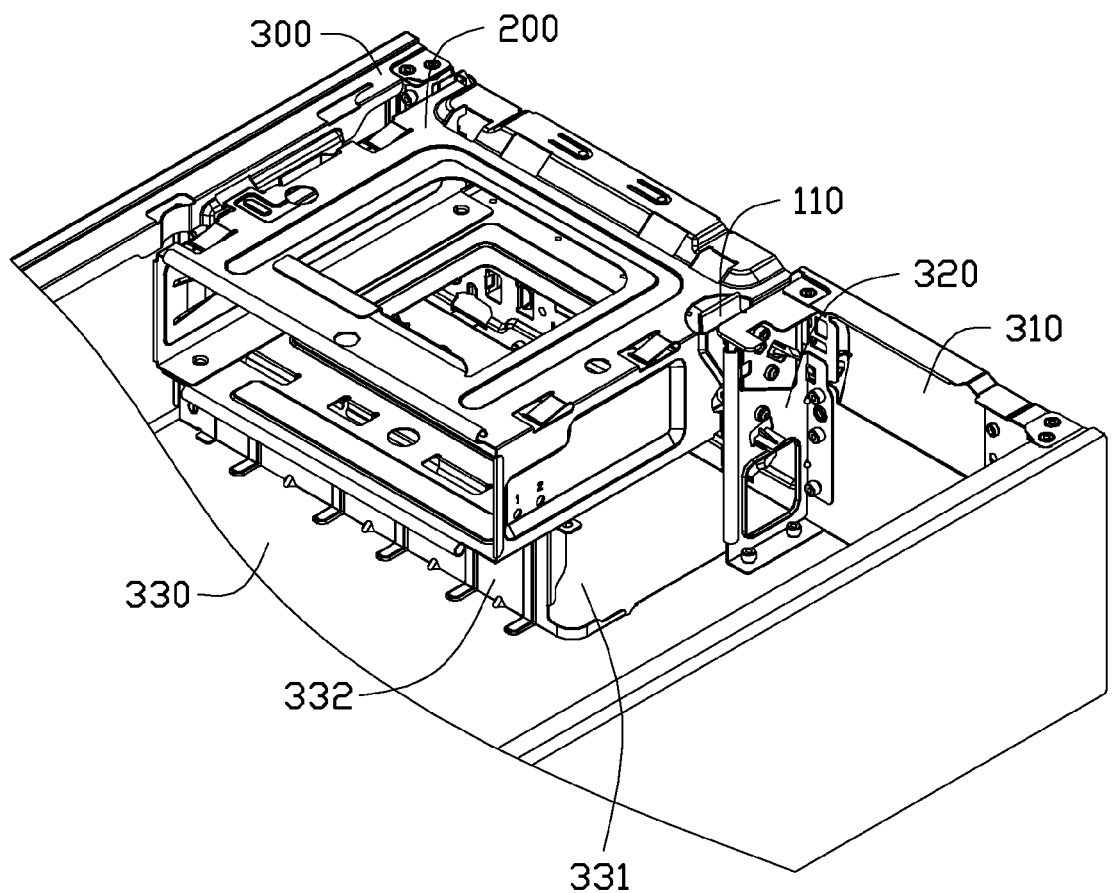
FIG. 5 is an assembly view of the mounting apparatus assembly of FIG. 1, with the data storage bracket and the mounting member fixed on the computer enclosure.
Figure 6:
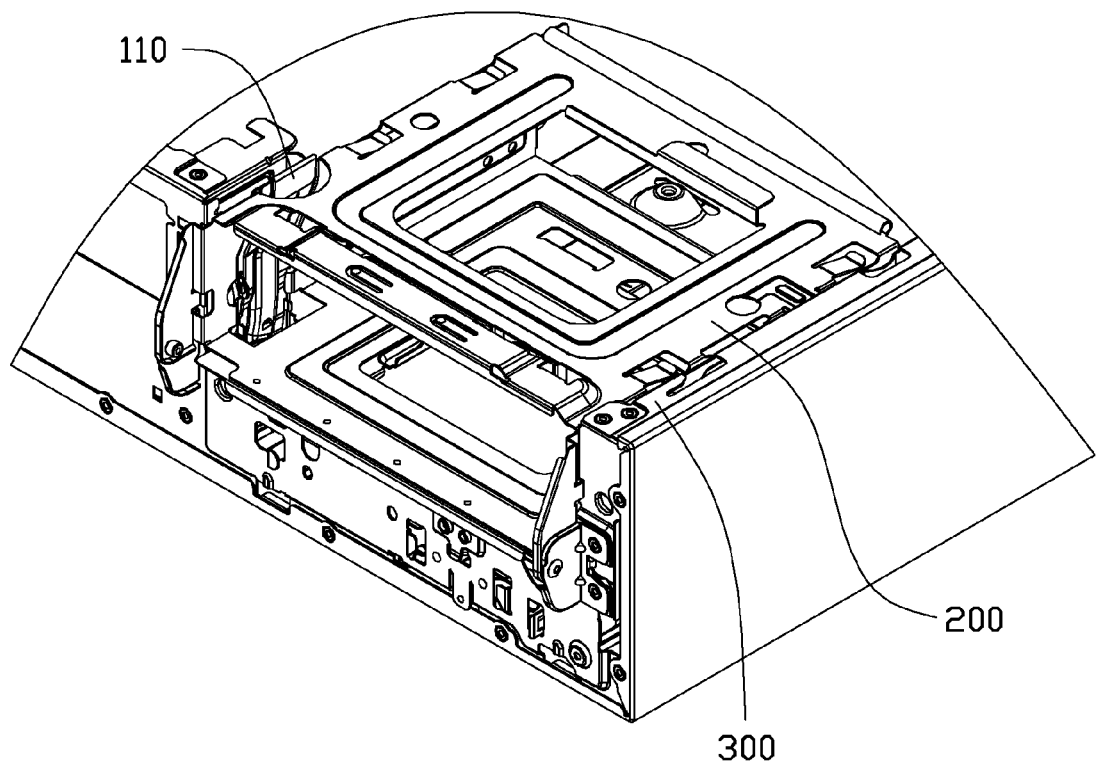
FIG. 6 is an isometric view of the mounting apparatus assembly of FIG. 5, viewed from another aspect.

Referring to FIGS. 5 and 6, in assembly, the mounting member 110 passes through the second opening 221 and the third opening 231 to be positioned on the data storage bracket 200. The two first fixing slices 111 pass through the mounting holes 2112 to be installed on the two first mounting slices 2111. The two second fixing slices 112 abut the two second mounting slices 2113. The third mounting slice 114 abuts the fixing portion 2117. The resisting portion 2114 abuts the mounting member 110. The elastic slice 2116 abuts an upper portion of the mounting member 110 along a first direction. A lower portion of the mounting member 110 abuts the guiding rail 120 along a second direction opposite to the first direction. The mounting portion 115 is engaged in one of the plurality of mounting slots 123. The plurality of protrusion portions 125 on the guiding rail 120 are aligned with the plurality of fixing holes 322 on the connection plate 320. Each of the plurality of hooks 124 passes each of the plurality of fifth openings 321. The top wall 1242 engages with the fastening slice 323. The connection wall 1241 contacts the fastening slice 323. The mounting member 110 is fixed on the sidewall 210. The guiding rail 120 is fixed on the connection plate 320. The upper portion of the mounting member 110 passes through the second opening 221. The lower portion of the mounting member 110 passes through the third opening 231. The data storage bracket 200 is fixed on the computer enclosure 300. The bottom wall 230 abuts the supporting slice 332.

Figure 7:
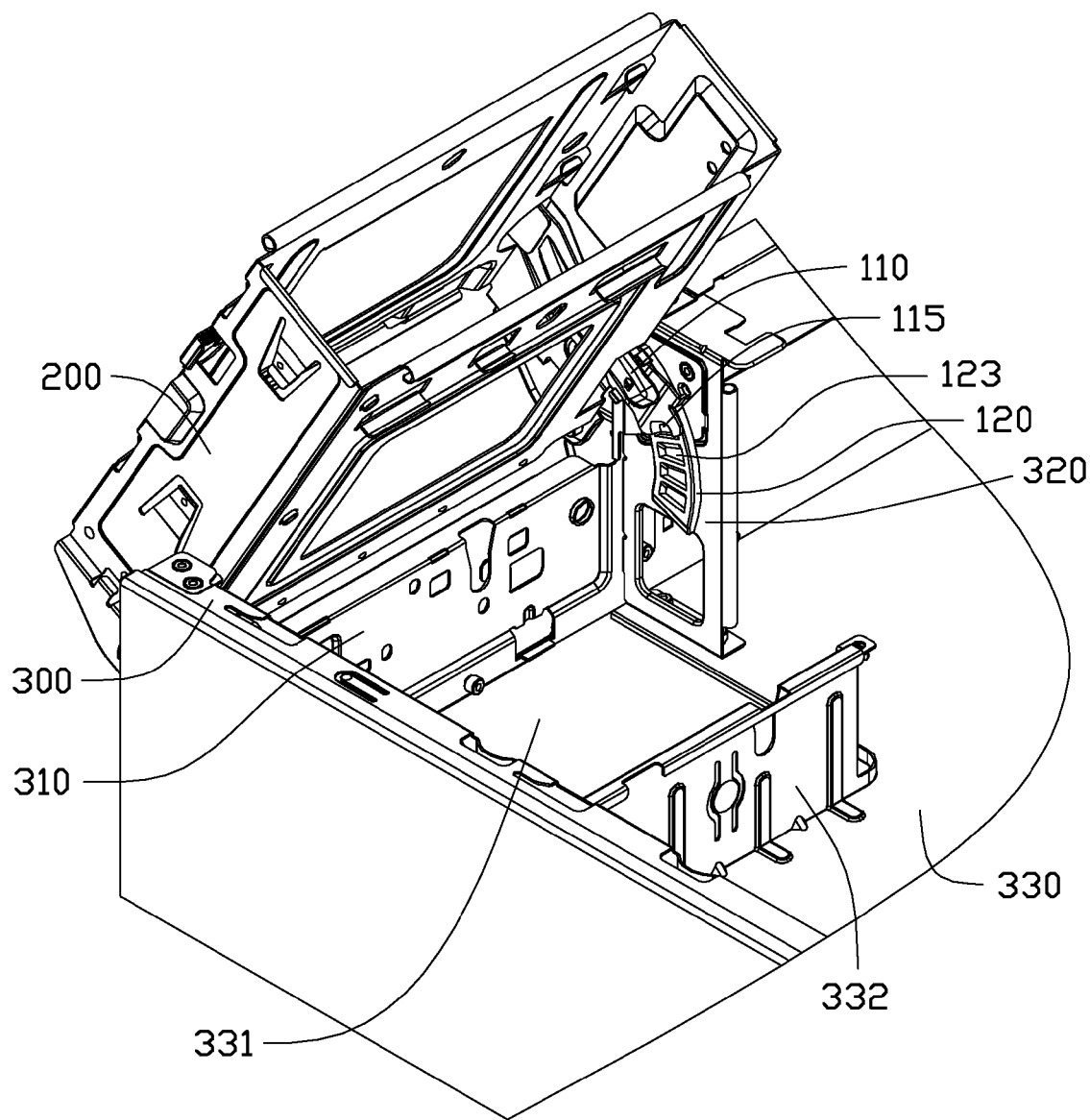
FIG. 7 is an isometric view of the mounting apparatus assembly of FIG. 6, with the data storage bracket rotated to a special angle relative to the computer enclosure.
Figure 8:
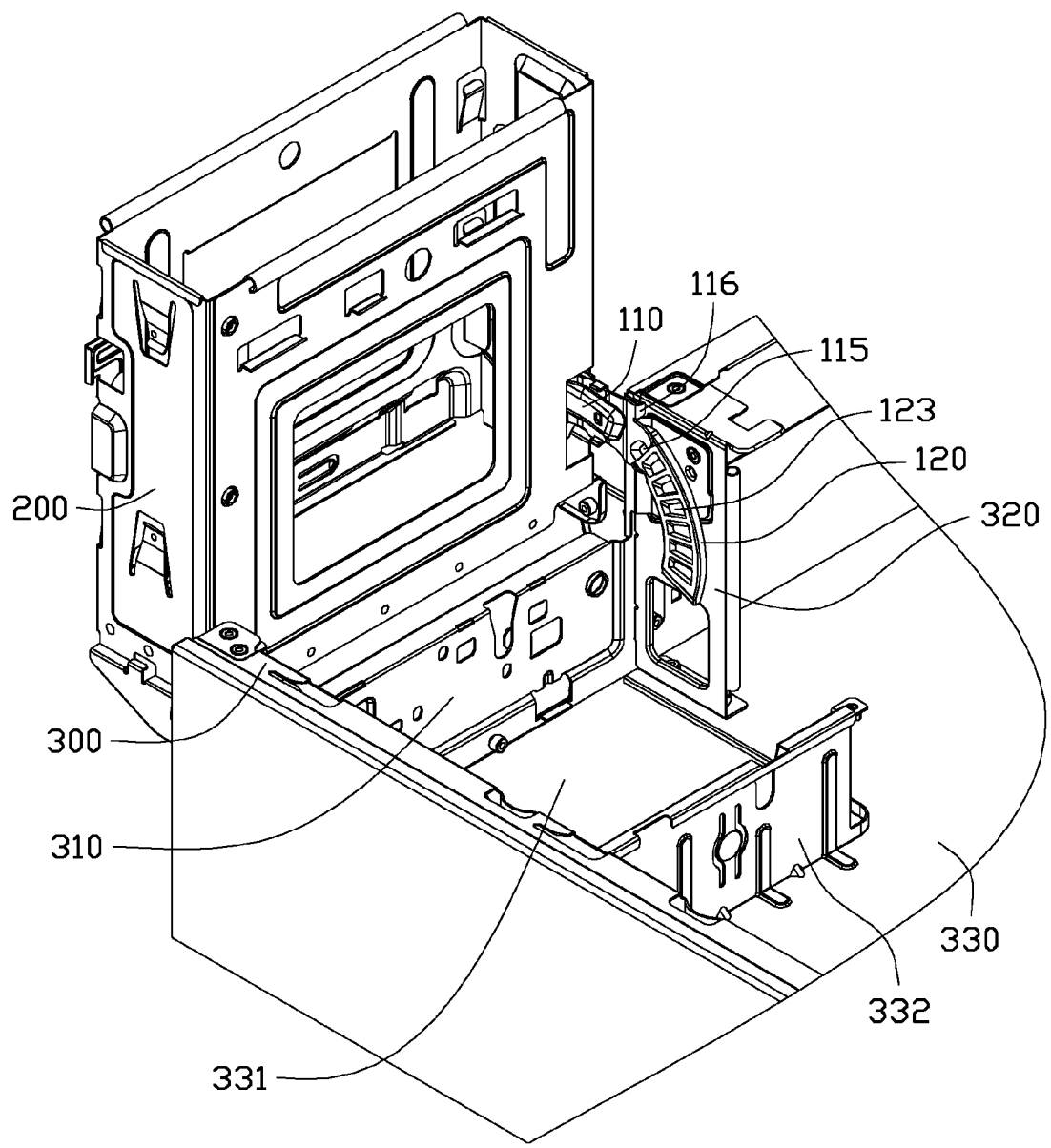
FIG. 8 is an isometric view of the mounting apparatus assembly of FIG. 6, with the data storage bracket rotated to 90 degrees angle relative to the computer enclosure.

Referring to FIGS. 7 and 8, the top wall 220 of the data storage bracket 200 is pulled up away from the computer enclosure 300. The mounting portion 115 is disengaged from the plurality of mounting slots 123. The mounting member 110 is disengaged from the guiding rail 120. The data storage bracket 200 is rotated relative to the computer enclosure 300 in a counterclockwise direction. When the data storage bracket 200 is rotated to a required angle, the mounting portion 115 is engaged in one of the plurality of mounting slots 123. The data storage bracket 200 is located at a required position on the computer enclosure 300. In one embodiment, a maximum angle that the data storage bracket 200 can be rotated relative to the computer enclosure 300 is 90 degrees. When the data storage bracket 200 is rotated to be perpendicular to the computer enclosure 300, the first restriction slice 116 abuts the second restriction slice 311 to stop the data storage bracket 200 from rotating further.

When the data storage bracket 200 is required to be installed in the computer enclosure 300, the upper portion of the mounting member 110 is pressed toward the connection plate 320 along the second direction. The lower portion of the mounting member 110 rotates relative to the resisting portion 2114. The mounting portion 115 disengages from the plurality of mounting slots 123. The mounting member 110 is disengaged from the guiding rail 120. The data storage bracket 200 is rotated relative to the computer enclosure 300 in a clockwise direction. When the data storage bracket 200 is rotated to a required angle, the mounting portion 115 is engaged in one of the plurality of mounting slots 123. The data storage bracket 200 is located at the required position on the computer enclosure 300.

Even though numerous characteristics and advantages of the present disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A mounting apparatus assembly, comprising:
   a data storage bracket;
   a mounting member fixed on the data storage bracket; the mounting member comprises a mounting portion on the mounting member;
   a computer enclosure; and
   a guiding rail fixed on the computer enclosure; the guiding rail comprises a plurality of mounting slots on the guiding rail; wherein the mounting portion is adapted to move along the guiding rail and to engage with the plurality of mounting slots when the data storage bracket is rotated relative to the computer enclosure, and the data storage bracket is located at a required position on the computer enclosure; wherein the data storage bracket comprises a sidewall; the sidewall comprises a slot for accommodating the mounting member, two first mounting slices extend from two side edges of the slot, and a mounting hole is defined in each of the two first mounting slices; the mounting member comprises two first fixing slices extending from two side edges of the mounting member; and each of the two first fixing slices is configured to pass through the mounting hole in each of the two first mounting slices.

2. The mounting apparatus assembly of claim 1, wherein two second mounting slices extend from two side edges of the slot; two second fixing slices extend from two side edges of the mounting member adjacent to the two first fixing slices; and the two second fixing slices abut the two second mounting slices when the two first fixing slices are located on the two first mounting slices.

3. The mounting apparatus assembly of claim 2, the slot comprises a resisting portion, a first opening therein adjacent to the resisting portion, and an elastic slice extends from the first opening; wherein when the two first fixing slices are located on the two first mounting slices, the resisting portion abuts the mounting member, the elastic slice abuts the mounting member along a first direction, and the mounting portion abuts one of the plurality of mounting slots of the guiding rail along a second direction opposite to the first direction to engage with the plurality of mounting slots.

4. The mounting apparatus assembly of claim 3, the slot further comprises a fixing portion; the mounting member further defines a fourth opening therein, and a third mounting slice extends from the fourth opening; wherein the third mounting slice abuts the fixing portion when the two first fixing slices of the mounting member are located on the two first mounting slices of the sidewall.

5. The mounting apparatus assembly of claim 1, wherein the guiding rail is arc shaped and comprises a first surface and a second surface; the plurality of mounting slots is located on the first surface; a plurality of hooks extend from the second surface; each of the plurality of hooks comprises a connection wall extending from the second surface and a top wall extending from a top edge of the connection wall; the computer enclosure comprises a connection plate; the connection plate defines a plurality of fifth openings therein; a fastening slice extends from a side edge of each of the plurality of fifth openings; when each of the plurality of hooks passes through each of the plurality of fifth openings, the top wall engages with the fastening slice; and the connection wall contacts the fastening slice.

6. The mounting apparatus assembly of claim 5, wherein a plurality of protrusion portions extends from the second surface; the connection plate defines a plurality of fixing holes therein; and each of the plurality of protrusion portions engages with each of the plurality of fixing holes when the guiding rail is fixed on the connection plate.

7. The mounting apparatus assembly of claim 5, wherein a first restriction slice extends perpendicularly from the mounting member adjacent to the mounting portion; the computer enclosure further comprises a front plate perpendicular to the connection plate; a second restriction slice extends perpendicularly from the front plate; and the first restriction slice abuts the second restriction slice when the data storage bracket is rotated to perpendicular to the computer enclosure.

8. The mounting apparatus assembly of claim 7, wherein the connection plate is fixed on the front plate by fasteners or riveters; and the sidewall of the data storage bracket is pivotally connected to the front plate of the computer enclosure by a rivet.

9. A mounting apparatus assembly, comprising:
   a data storage bracket;
   a mounting member fixed on the data storage bracket; and the mounting member comprises a mounting portion;
   a first restriction slice extending from the mounting member adjacent to the mounting portion;
   a computer enclosure comprising a front plate; and a second restriction slice extends from the front plate; and
   a guiding rail fixed on the computer enclosure; and the guiding rail comprises a plurality of mounting slots; wherein when the data storage bracket is rotated relative to the computer enclosure, the mounting portion is adapted to move along the guiding rail and engage with one of the plurality of mounting slots, and the data storage bracket is located at a required position on the computer enclosure; and when the data storage bracket is rotated to perpendicular to the computer enclosure, the data storage bracket is prevented from rotating out of the computer enclosure by the first restriction slice abutting the second restriction slice.

10. The mounting apparatus assembly of claim 9, wherein the data storage bracket comprises a sidewall; a slot on the sidewall for accommodating the mounting member; two first mounting slices extend from two side edges of the slot; each of the two first mounting slices defines a mounting hole therein; two first fixing slices extend from two side edges of the mounting member; and each of the two first fixing slices is configured to pass through each mounting hole located on each of the two first mounting slices.

11. The mounting apparatus assembly of claim 10, wherein two second mounting slices extend from two side edges of the slot; two second fixing slices extend from two side edges of the mounting member adjacent to the two first fixing slices; and each of the two second fixing slices abuts each of the two second mounting slices when the two first fixing slices are located on the two first mounting slices.

12. The mounting apparatus assembly of claim 11, wherein the slot defines a resisting portion, and a first opening adjacent to the resisting portion; an elastic slice extends from the first opening; when the two first fixing slices are located on the two first mounting slices, the resisting portion abuts the mounting member, the elastic slice abuts the mounting member along a first direction, and the mounting portion abuts one of the plurality of mounting slots along a second direction opposite to the first direction to engage with the plurality of mounting slots.

13. The mounting apparatus assembly of claim 12, wherein the slot further comprises a fixing portion; the mounting member defines a fourth opening therein; a third mounting slice extends from the fourth opening; and the third mounting slice abuts the fixing portion when each of the two first fixing slices is located on each of the two first mounting slices.

14. The mounting apparatus assembly of claim 10, wherein the guiding rail is arc shaped and comprises a first surface and a second surface; the plurality of mounting slots is located on the first surface; a plurality of hooks extend from the second surface; each of the plurality of hooks comprises a connection wall extending from the second surface, and a top wall extending from a top edge of the connection wall; the computer enclosure further comprises a connection plate perpendicular to the front plate; the connection plate defines a plurality of fifth openings therein; a fastening slice extends from a side edge of each of the plurality of fifth openings; when each of the plurality of hooks passes through each of the plurality of fifth openings, the top wall engages with the fastening slice, and the connection wall contacts the fastening slice.

15. The mounting apparatus assembly of claim 14, wherein a plurality of protrusion portions extends from the second surface; the connection plate defines a plurality of fixing holes therein; and each of the plurality of protrusion portions engages with each of the plurality of fixing holes when the guiding rail is fixed on the connection plate.

16. The mounting apparatus assembly of claim 14, wherein the connection plate is fixed on the front plate by fasteners or riveters; and the sidewall of the data storage bracket is pivotally connected to the front plate of the computer enclosure by a rivet.

* * * * *